Feb. 10, 1959    A. J. MOOERS ET AL    2,873,075
AUTOMATIC HOVERING CONTROL SYSTEM
Filed May 24, 1954    3 Sheets-Sheet 1

INVENTORS
ALDEN J. MOOERS
CLARENCE E. VOGEL
BY George H Fisher
ATTORNEY

United States Patent Office 2,873,075
Patented Feb. 10, 1959

2,873,075

AUTOMATIC HOVERING CONTROL SYSTEM

Alden J. Mooers and Clarence E. Vogel, Minneapolis, Minn., assignors to Minneapolis-Honeywell Regulator Company, Minneapolis, Minn., a corporation of Delaware Application May 24, 1954, Serial No. 431,858

16 Claims. (Cl. 244—17.13)

This invention relates to automatic control of rotary wing aircraft and more particularly to automatic hovering control for such aircraft.

The rotary wing aircraft because of its inherent instability requires constant attention of the pilot in the control of the flight thereof and particularly in the control of hovering flight. Automatic hovering, that is control of the aircraft at a constant altitude and substantially stationary relative to or over a predetermined point such as a point on the surface of the earth, is known in the art of aircraft control. Because hovering flight is generally done at relatively low altitudes or in close proximity to some object or surface, it is essential that accurate and fully stabilized operation accompany the same. The subject invention provides an improved automatic hovering control which is adapted to operate through a conventional automatic pilot apparatus for rotary wing aircraft to control, accurately and safely, hovering flight through joint operation of cyclic and collective pitch controls for such aircraft.

It is therefore an object of our invention to provide an improved automatic hovering control for rotary wing aircraft.

It is another object of this invention to provide in an automatic hovering control an improved altitude sensor.

Another object of this invention is to provide in an automatic hovering control an improved means for accurately maintaining aircraft altitude and lateral and longitudinal control with respect to a fixed point while hovering.

Still another object of this invention is to provide an automatic hovering apparatus in which hovering altitude may be readily and accurately changed without disengagement or termination of operation of the hovering apparatus.

A further object of this invention is to provide improved automatic hovering control apparatus in which the altitude, lateral and longitudinal displacement devices control both cyclic and collective pitch so that a change in one pitch control is accompanied by a change in the other pitch control to stabilize hovering operation.

A still further object of this invention is to provide in an automatic hovering apparatus altitude compensation for cyclic pitch changes. These and other objects of this invention will become apparent from the reading of the attached description together with the drawings wherein.

Figure 1:
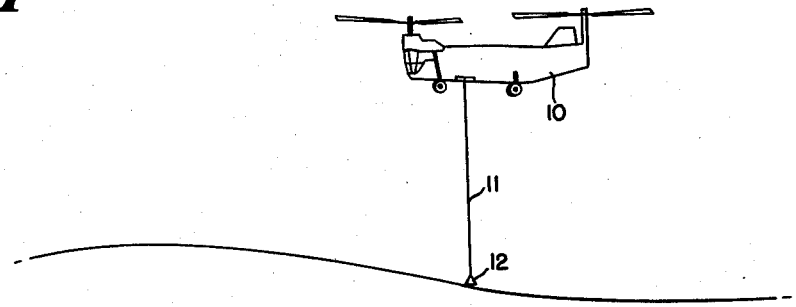
Figure 1 is a schematic diagram of rotary wing aircraft using the improved hovering control apparatus.

Our improved hovering control apparatus is shown schematically in use with an aircraft in Figure 1 in which the aircraft indicated at 10 has suspended therefrom a cable 11 with a weight 12 attached thereto, the cable being lowered through an opening in the bottom of the aircraft during hovering operation. This improved hovering control apparatus is designed for hovering over land or water and over hilly inclines or uneven terrain. The weight 12 causes a tension on the cable 11 which is sensed through a suitable tension sensing apparatus to be later described. When the weight is in contact with the terrain or water, the weight will be supported or buoyed up in such a manner as to reduce the tension on the cable and the sensing apparatus will operate a suitable controller also to be later described which controller will be essentially the altitude control for the hovering apparatus. Whenever the weight is not in contact with the water or terrain, the tension on the cable will operate the tension sensing device and controller in such a manner as to produce a controlling effect which will have an opposite effect on the altitude control portion of the hovering apparatus. Also included in the hovering control and to be described in detail below although not shown in Figure 1 is apparatus for sensing lateral and longitudinal displacement of the aircraft relative to the point of contact of the weight with the terrain.

Figure 2:
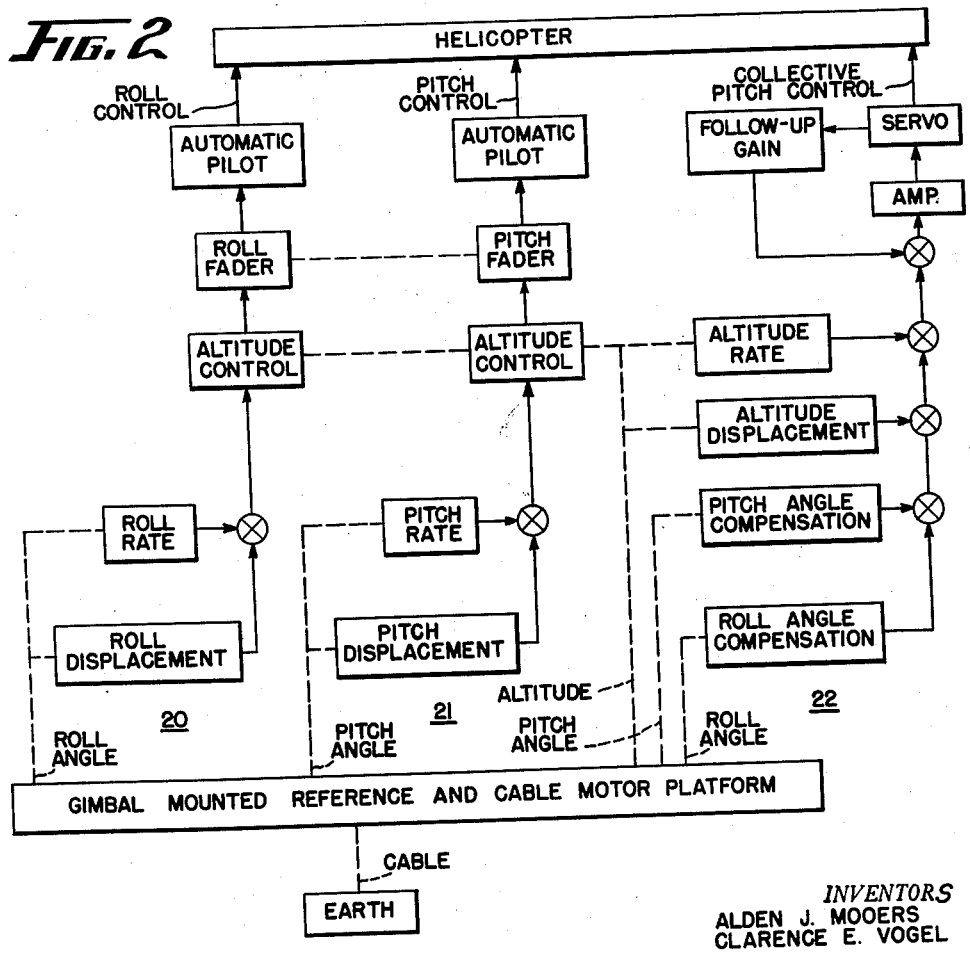
Figure 2 is a block diagram of our improved hovering control system.

In Figure 2 is shown a block diagram of the hovering control system indicating generally the main components of the hovering control apparatus. It will be seen from the block diagram that the subject hovering control operates in conjunction with an automatic pilot for the rotary wing aircraft, the details of which are omitted herein inasmuch as they form no part of the subject invention. This automatic pilot will operate normally in connection with lateral and longitudinal control or as to be hereinafter identified as roll and pitch control through separate motors which are not shown to effect a change in the blade pitch of the rotary blades during their cyclic operation or in a manner well known adjust cyclic pitch to effect lateral and longitudinal displacement changes in the aircraft position. There is shown in Figure 2 essentially three channels for the hovering control, namely the roll control indicated generally at 20, the pitch or longitudinal control indicated generally at 21, and the altitude or collective pitch control indicated generally at 22. As indicated above the roll and pitch control effect change in cyclic pitch for the aircraft and the altitude control or collective pitch channel acts upon a separate servomotor effecting change in the collective pitch of the rotary wing aircraft to effect altitude changes. As indicated in Figure 2 this hovering control includes a gimbal mounted reference which will be later identified from which roll, pitch and altitude information is obtained, this information acting through roll displacement and roll rate potentiometers in the roll axis and modified by altitude information to be fed into the automatic pilot whenever the hovering control is engaged to effect roll changes or lateral changes in the cyclic pitch control. Similarly, the pitch information is fed as pitch displacement and pitch rate modified by altitude to the automatic pilot to effect pitch changes or longitudinal changes in the cyclic pitch control for the aircraft. The roll and pitch information together with altitude information is utilized in a collective pitch or altitude channel together with rate of change of altitude to effect control of the collective pitch servomotor and vary altitude of the aircraft. As indicated in Figure 2 all this information is obtained through use of the cable with the weight attached thereto, the cable acting as a primary sensing device for the hovering apparatus. It is to be assumed in connection with the subject application that during hovering the thrust or speed of rotation of the rotary blades will be held substantially constant but it should be recognized that adjustment of the R. P. M. of the rotating blades may control altitude changes and that the collective pitch servomotor could operate to effect this type of control or joint control over pitch and thrust to vary altitude. To compensate for the loss of altitude or lift variation due to tilt of the rotor blades during lateral or longitudinal movement, signals indicative of these movements are supplied to the altitude bridge to effect altitude changes.

Figure 4:
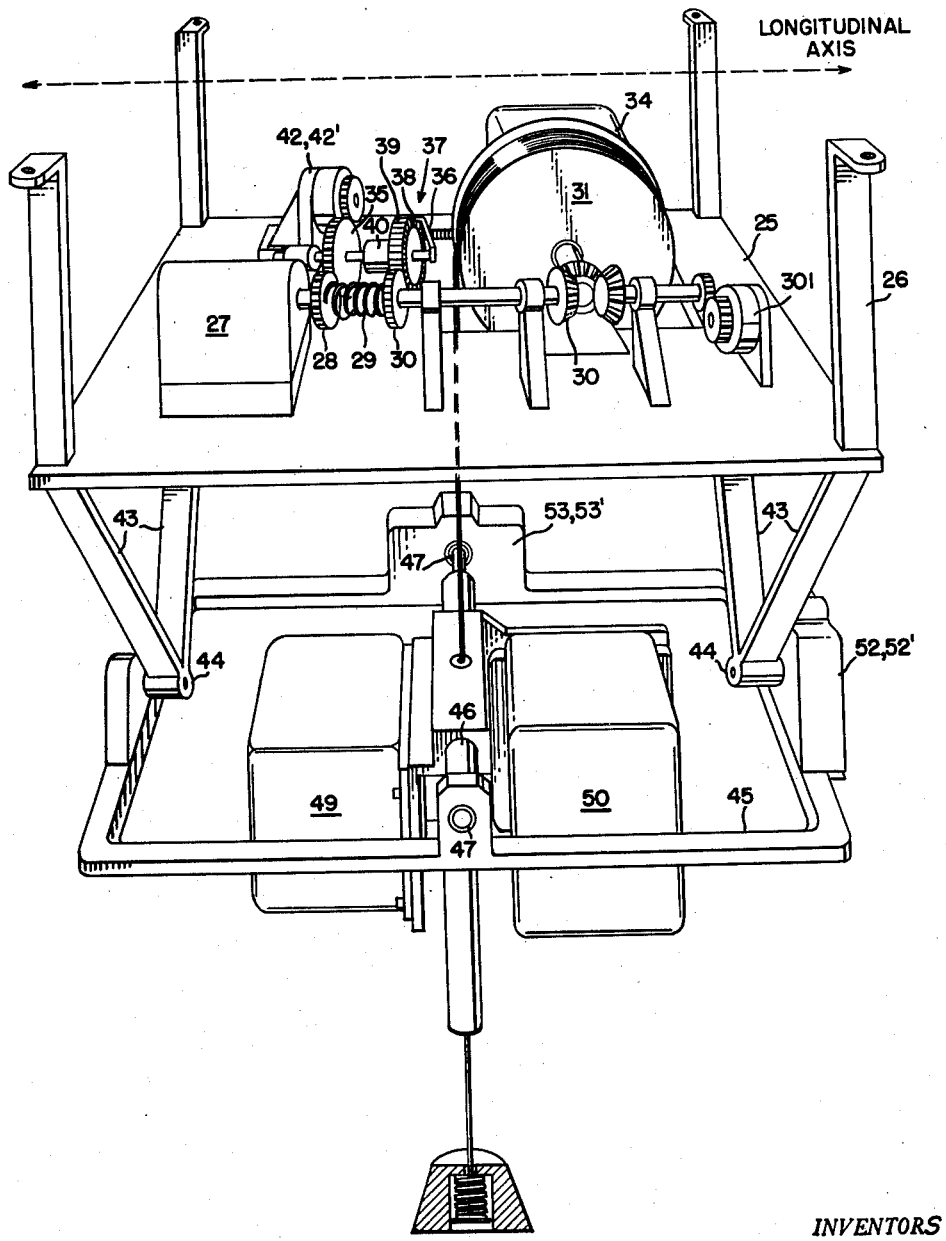
Figure 4 is a schematic drawing of the gyro table and cable motor platform of our improved hovering control.

The source of the altitude, rate of altitude change, roll displacement and roll rate, pitch displacement and pitch rate signals for the control of the hovering control apparatus will be found in the schematic drawing of the gyro table and cable motor platform shown in Figure 4. The cable motor platform is indicated at 25 and is adapted to be attached to the frame of the aircraft through suitable means such as brackets 26 to be stationary therewith. It mounts a cable motor 27 having associated gearing 28 which drives through a spring 29 and additional gearing 30 to drive a pivoted cable drum indicated at 31 carrying the cable 11. Attached to the cable drum and rotating therewith is an altitude rate gyro indicated at 34. Also driven from the gearing 28 of motor 27 is a second stage gearing 35 which drives a wiper of an altitude displacement potentiometer indicated generally at 37, the wiper taking the number 36. Potentiometer 37 has a winding indicated at 38 which is mounted on a gear 39 which is journaled in a member 40 and meshes with the gearing 30 of the cable drum. It will be seen from Figure 4 that operation of the motor in driving the drum will be through the spring 29 and that the motor will drive directly the wiper of the potentiometer 37 while the winding 38 of the potentiometer is driven through gearing on the other side of the tension spring or with the cable drum. Thus a tension applied to the cable drum will be reflected to the winding 38 of the potentiometer which will be displaced relative to the wiper driven by the cable motor. It will be evident that the presence of tension will rotate the cable drum and consequently tighten the spring 29 such that the winding 38 will bear a definite relation or position with respect to the wiper 36 whereas absence of tension on the cable will release tension on the spring 29 and provide a new relative position for the wiper 36 relative to the winding 38 of the potentiometer. Also driven with cable drum 31 from gearing 30 is a synchro pickoff 301 which indicates the amount of cable fed out from the cable drum. In adition, a pair of signal generators or potentiometers 42 and 42' are driven from gearing 35 off of the cable motor 27.

Journaled to the platform 25 through brackets 43 and pivots 44 in a gimbal or cardonic mounting 45 which in turn pivots at fluid damped journals 47 a platform or sleeve 46 which surrounds the cable and is adapted to be displaced thereby. Attached to the sleeve or platform is a rate gyro 49 and a second rate gyro 50 one of which responds to displacement of the platform about the journals 44 mounting the gimbal to the platform and the second of which responds to displacement of the sleeve about the journals 47 mounting the sleeve to the gimbal. Assuming the direction indicated by the arrow in Figure 4 is the longitudinal axis of the aircraft, the gyro 49 will respond to roll rate and the gyro 50 to pitch rate. Included on the gimbal 45 and operated by relative movement between the gimbal 45 and platform 25 is a pair of angle potentiometers 52 and 52' which respond to roll displacement of the cable. Also mounted on the gimbal 45 and actuated by displacement between the sleeve and the gimbal is a second pair of angle potentiometers 53 and 53' which respond to pitch displacement of the cable relative to the platform. Thus it will be seen that the cable drum drive and potentiometer 37 will sense and indicate the presence or absence of cable tension and that the pickoffs or potentiometers 42 and 42' will indicate a measure of the length of cable fed out from the drum. Signal generator 301, as will be later noted, is utilized for cockpit indication of cable fed out or hovering altitude. Assuming a condition when the cable and weight are affected by gravity alone, that is, out of contact with the earth's surface, the cable should be positioned centrally within the sleeve 46 and the gimbal structure will position the angle potentiometers 52 and 52' and 53 and 53' to a null or reference position and the rate devices 49 and 50 will not have any turning rates or rates of displacement impressed thereon. In the event that the weight and cable is brought into contact with the ground and the aircraft moves laterally or longitudinally with respect to the point on the ground at which the weight contacts the same, the gimbal structure will be moved by virtue of the contact between the cable and sleeve 46 to displace one or the other or both of the angle potentiometers and at the same time move one or the other or both of the rate gyros to indicate the rate of displacement and the angle of displacement of the aircraft with respect to the fixed hovering point.

Figure 3:
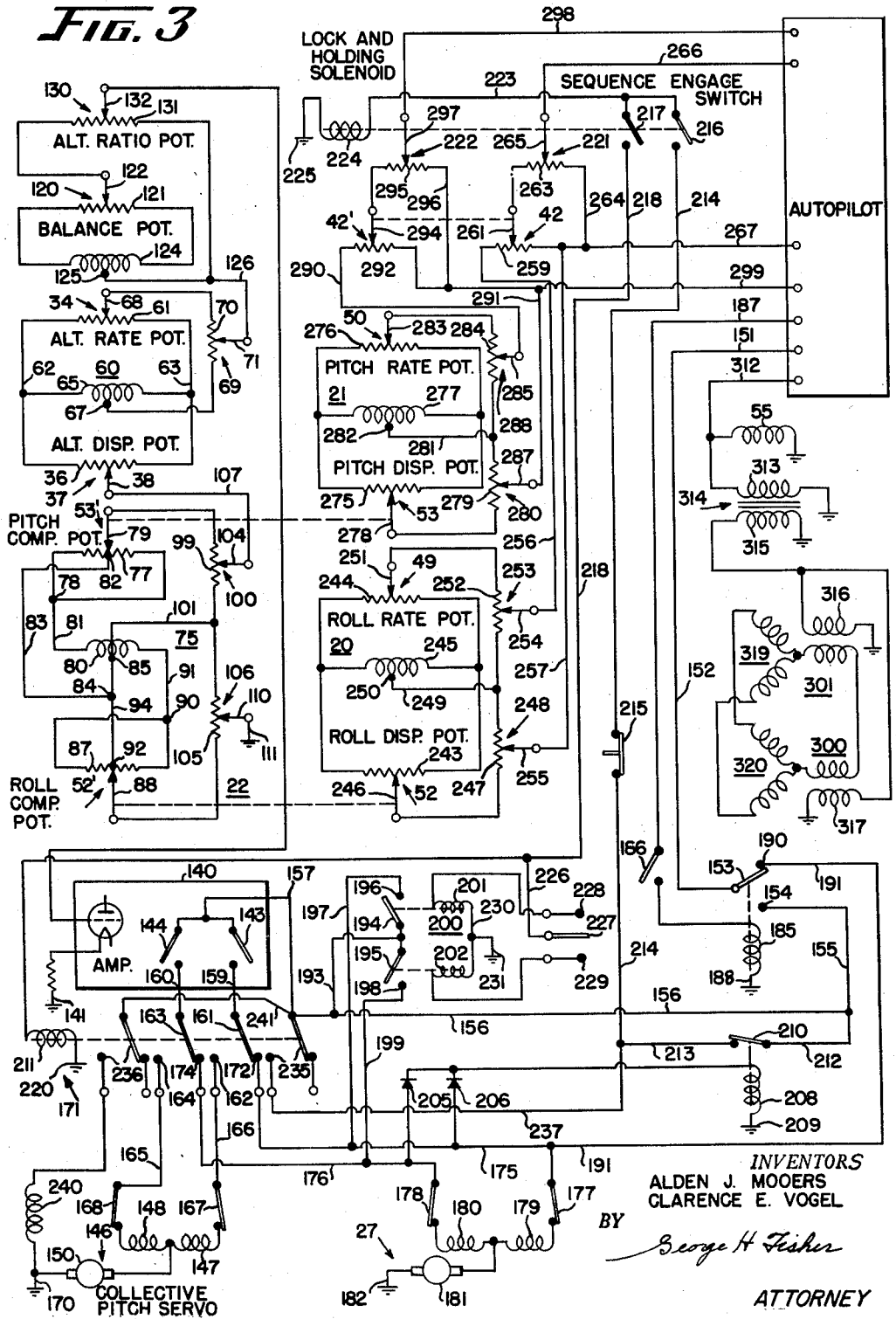
Figure 3 is a schematic circuit diagram of the hovering control system.

The schematic wiring diagram in Figure 3 discloses the circuitry for control of the collective pitch and cyclic pitch servomotors during hovering. Considering first the collective pitch or altitude channel of the hovering control it will be seen that the main component is comprised of a bridge 60 formed by the altitude displacement potentiometer 37 having the winding 36 thereof connected in parallel with a winding 61 of an altitude rate potentiometer 34 through conductors indicated at 62 and 63. The bridge is energized by a secondary winding 65 of a transformer whose primary winding 55 serves as a primary for all of the bridges of the control and is energized from an alternating current source of power through the automatic pilot. Connected to a tap 67 of the secondary winding 65 and to the wiper 68 of the altitude rate potentiometer is a rate adjustment potentiometer 69 having a winding 70 and a wiper 71. The winding is connected to the wiper 68 and center tap 67. This main bridge component of the altitude channel is connected to a bridge type network indicated generally at 75 which includes pitch and roll potentiometers 53' and 52' for compensation purposes. The pitch angle compensation potentiometer 53' has a winding 77 the extremities of which are tied together at a common point 78 and a wiper 79. This pitch compensation potentiometer is energized from a secondary winding 80 of a transformer, whose primary winding is indicated at 55 energized from the common alternating current source. One extremity of the secondary winding 80 is connected to the common point 78 of the pitch compensation potentiometer through a conductor 81. A center tap 82 of the pitch compensation potentiometer is connected by a conductor 83 and a conductor 84 to a center tap 85 of the secondary winding 80. Roll compensation is provided in this network from the potentiometer 52' having a winding 87 and a wiper 88, the extremities of the winding 87 being connected together at a common point 90 which in turn is connected through conductor 91 to the opposite extremity of secondary winding 80 of the energizing transformer from that to which the pitch compensation potentiometer is connected. A center tap 92 on the winding 87 is connected through a conductor 94 and conductor 84 to a center tap 85 of the secondary winding 80. The wiper 79 at the pitch compensation potentiometer is connected to the one end of a winding 99 of an adjustment potentiometer 100 whose other extremity is connected by a conductor 101 to the center tap 85 of the secondary winding 80. Similarly the wiper 88 of the roll compensation potentiometer is connected to a winding 105 of an adjustment potentiometer 106 with the other extremity of a winding 105 being connected to the conductor 101 and the center tap of the secondary winding 80. The adjustment or ratio potentiometer 100 for the pitch compensation potentiometer has a wiper 104 which is connected by a conductor 107 to the wiper 38 of the altitude displacement potentiometer to connect the bridge elements 60 and 75. Similarly the roll ratio potentiometer 106 has a wiper 110 which is grounded as at 111 to complete the circuit in a manner to be later described.

Attached to bridge 60 is a servo balance potentiometer 120 having a winding 121 and a wiper 122, the winding being connected to extremities of a secondary winding 124 of an energizing transformer having the common primary winding 55. Secondary winding 124 has a center tap at 125 which is connected by a conductor 126 to wiper 71 of the altitude rate adjustment potentiometer 69. Attached to wiper 122 of the servo balance potentiometer, which is driven by the collective pitch servomotor, to be later identified, is an altitude ratio potentiometer 130 having a winding 131 which is connected at one extremity to the wiper 122 and at the other extremity to the conductor 126 attached to the center tap of the secondary winding 124. Ratio potentiometer 130 has a wiper 132 which is connected in the input of an amplifier 140 controlling the collective pitch servomotor 146. Amplifier 140 also has a grounded input terminal 141 which completes the input circuit to the amplifier through the grounded connection 111 of the roll compensation ratio potentiometer 106.

The collective pitch amplifier 140 is shown in block form with its details omitted except for a pair of relay contacts 143 and 144 which respond selectively to input signals to the amplifier or which close respectively upon signals of opposite phase or sense. The details of the amplifier are omitted here inasmuch as they form no part of the subject invention and it will be understood that any amplifier capable of operating a pair of relays selectively upon input signals of opposite sense may be substituted herein. The relay contacts 143 and 144 of the amplifier are designed to control the direction of operation of the collective pitch servo indicated at 146 through selected energization of its directional field windings 147 and 148 together with the energization of its armature 150. The power circuit for the collective pitch servomotor 146 includes the direct current source 151, conductor 152, contacts 153 and 154 of a master relay 185, conductor 155, conductors 156 and 157, one or the other of the relay contacts 143 and 144 to conductors 159 or 160, contacts 161 and 162 or 163 and 164 of an engage relay 171, conductors 165 or 166 to limit switches 167 or 168, to directional field windings 147 or 148, armature 150 to a grounded connection 170. Thus it will be seen that when the master relay 185 is in an energized position and its contacts 153 and 154 are closed, that one or the other of the contacts 143 and 144 of the collective pitch amplifier will control the energization of one or the other of the directional field windings 147 and 148 and the armature 150 of the collective pitch servomotor when the engage relay 171 is closed. The movable contacts 161 and 163 of the engage relay are normally in contact with out contacts 172 and 174 of the relay to provide for circuits through conductors 175 or 176 to limit switches 177 or 178 and directional field windings 179 and 180 of the cable drum motor indicated generally at 27 and through an armature 181 thereof to a grounded connection 182. Thus, it will be seen that with the engage relay in a deenergized position, the collective pitch amplifier through its relay contacts 143 and 144 will control selectively under these conditions the directional rotation of the cable drum motor 27. Contacts of the master switch 153 and 154 are controlled through energization of a relay coil 185 which is connected through a manually operated switch indicated at 186 to a source of D. C. power 187 which is present only when the automatic pilot apparatus of the aircraft is energized, this circuit being completed through a grounded connection 188 of the coil 185. For purposes which will be later identified, the cable drum motor 27 is also energized through its field winding 179 to provide for up direction rotation of the cable in the off position of the master relay in a circuit leading from the D. C. supply 151, conductor 152, movable contact 153 to out contact 190 of the master relay, conductor 191 to conductor 175 and through the limit switch 177, directional field winding 179, armature 181 to grounded connection 182 of the cable drum motor.

A still further energization circuit for the cable drum motor 27 will be found in the on position of the master relay leading from the supply 151, conductor 152, contacts 153 and 154, conductors 155 and 156 to a conductor 193 to movable contacts 194 and 195 of a pair of switches operated by relay coils and to be hereinafter identified as the altitude beeper relay 200. The contact 194 cooperates with a contact 196 which is connected to a conductor 197 leading to the conductor 175 and directional field winding 179 of the cable drum motor 27. The contact 195 cooperates with a contact 198 which is connected to a conductor 199 leading to the conductor 176 and directional field windings 180 of the cable drum motor 27. The contacts 194 and 196 and the contacts 195 and 198 are controlled respectively from coils 201 and 202, the coils being selectively energized through a control circuit to be later identified. Thus, depending upon which of the pair of contacts 194 and 196 or 195 and 198 are closed, the cable drum motor will be selectively energized to rotate in one direction or the other.

Also connected to conductors 175 and 176 leading to the directional field windings 179 and 180 of the cable drum motor are rectifiers 205 and 206 which are connected together at their opposite extremities to one end of a relay coil 208, which is grounded at its other extremity at 209, this relay coil to be hereinafter identified as an anti-engage relay. Relay coil 208 operates a switch indicated generally at 210 which is included in the energization circuit for the engage relay 171 or its coil 211. Whenever the cable drum motor 27 is energized, the anti-engage relay will be energized to open the contacts 210, these contacts being of the normally closed type.

With switch contacts 153 and 154 of the master relay closed, an energization circuit from the source 151 is provided through the conductor 155, conductor 212, switch 210 to conductors 213 and 214, a manually operated disengage switch indicated at 215, a first sequence engage switch 216, a second sequence engage switch 217, conductor 218 to coil 211 and ground connection 220 completing the circuit to the D. C. supply. The sequence engage switches 216 and 217 are operated sequentially and are manually operated in conjunction with a pair of fader potentiometers indicated at 221 and 222, the contact 216 being the first to close and setting up an energization circuit from the master relay contacts 153 and 154 and engage anti-engage contact 210 in the closed position through conductor 214, switch 215, switch 216 to a conductor 223 and a lock and hold solenoid 224 to a ground connection 225. The lock and hold solenoid operates initially as an interlock to prevent the fader potentiometers and switch 217 from becoming engaged too rapidly and under conditions where the aircraft altitude is changing as will become evident as the disclosure proceeds. After the lock and hold solenoid 224 is energized, further movement may be made to move the potentiometers 221 and 222 to an extreme position wherein the lock and hold solenoid will hold the manual operating mechanism for this apparatus in a locked position and the switch 217 will be closed setting up the energization circuit for the engage relay 171 in a manner previously described. Closure of the sequence engage switch contact 217 sets up a circuit for the altitude beeper relay 200 from conductor 218, to a conductor 226 to a movable contact 227 of a manually operated altitude beeper control and through stationary contacts 228 and 229 of this control through the coils 201 and 202 which are connected together by a common conductor 230 and to a ground connection 231 completing this energization circuit. Thus it will be seen that whenever the beeper control is actuated, that is, the contacts 227 and 228 or the contacts 227 and 229 are closed the relays 201 or 202 will be energized to operate the switch contacts 194 and 196 or the contacts 195 and 198 and set up the auxiliary energization circuit for the cable motor 27 previously described. Engage relay 171 which is also energized through closure of the sequence engage contacts 216 and 217 in addition to setting up the energization circuits for the collective pitch servomotor and the cable drum motor as described above include a pair of normally open contacts 235 and 236 which are operated to their closed position with energization of the relay coil 211. The contact 235 sets up a holding circuit when closed around the anti-engage relay contacts 10 or in parallel therewith through a conductor 237 and 156 to maintain the energization circuit through the sequence engage switch to the lock and hold solenoid and the engage relay after the sequence engage switch has been locked in the closed position. The contact 236 sets up an energization circuit for an engage solenoid on the collective pitch servomotor 146, the engage solenoid being indicated generally at 240 and connected at one extremity to the ground 170 and at the other extremity to the contact 236 which in turn is connected by a conductor 241 to conductor 156 leading to conductor 155 and master switch contacts 153 and 154 to the source of power 151. Thus, closure of the master switch and energization of the engage relay will set up energization circuits for the collective pitch servomotor through the relay contacts 143 and 144 of the collective pitch amplifier 140 and at the same time will energize the engage solenoid to connect the collective pitch control to the servomotor 146 for operation thereby.

In addition to the collective pitch or altitude control circuit and the associated power circuit circuitry controlling the collective pitch servomotor and the cable drum, our improved hovering control apparatus includes roll and pitch control channels 20 and 21 which operate in conjunction with the automatic pilot apparatus when the fader control potentiometers 221 and 222 are in their on position to control jointly or separately operation of cyclic pitch changing mechanism to effect lateral and longitudinal displacement of the aircraft. As indicated above, the details of the automatic pilot apparatus and the associated servomotors that are operating on the cyclic pitch control are conventional and consequently their details are omitted here for simplicity. The roll or lateral displacement channel 20 of the hovering control includes the roll displacement potentiometer 52 and roll rate potentiometer 49 connected in a conventional bridge arrangement, that is, their respective windings 243 and 244 being connected together and to a secondary winding 245 of the bridge energizing source with a wiper 246 of the roll displacement potentiometer 52 being connected to one extremity of a winding 247 of a ratio or roll adjustment potentiometer 248, the winding 247 being connected at its opposite extremity through a conductor 249 to a center tap 250 of the secondary winding 245. Similarly, the roll rate potentiometer 49 includes the wiper 251 which is connected to one extremity of a winding 252 of a roll rate ratio potentiometer 253 whose opposite extremity is connected to the conductor 249 and center tap 250 of the secondary winding 245. The roll rate adjustment potentiometer 253 and roll displacement adjustment potentiometer 248 have wipers 254 and 255 respectively which are connected through conductors 256 and 257 to a winding 259 of an altitude scheduling potentiometer 42. The roll altitude scheduling potentiometer 42 is in turn connected through its wiper 261 to the roll fader pot 221 at its winding 263. The other extremity of the fader winding 263 being connected by a conductor 264 to conductors 267 and 257, the latter leading to the wiper 255 of the roll displacement adjustment 248. The roll fader potentiometer has a wiper 265 which is connected by a conductor 266 into the roll channel of the automatic pilot apparatus this circuit being completed by conductor 267 connected to conductor 264 which in turn is connected to the roll fader potentiometer winding 259.

A similar circuit exists in the pitch axis or longitudinal axis or channel for the hovering control, the pitch displacement potentiometer 53 and the pitch rate potentiometer 50 being connected in a bridge circuit through common connections between its respective windings 275 and 276 which connect the extremities of the windings together and to extremities of a secondary winding 277 of an energizing transformer. The pitch displacement potentiometer 53 has a wiper 278 which is connected to a winding 279 of a pitch displacement adjustment potentiometer 280 the other extremity of this winding being connected through a conductor 281 to a center tap 282 of transformer secondary 277. Similarly, the pitch rate potentiometer has a wiper 283 which is connected to a winding 284 of a pitch rate adjustment potentiometer 288 the other extremity of this winding being connected to the conductor 281 and center tap 282 of the secondary winding 277 of the energizing transformer. The pitch displacement adjustment potentiometer 280 and the pitch rate adjustment potentiometer 288 have wipers 287 and 285 respectively, which are connected through conductors 290 and 291 to the extremities of a winding 292 of the altitude scheduling potentiometer 42'. This altitude scheduling potentiometer 42' operating in the pitch axis has a wiper 294 which is connected to the pitch fader potentiometer 222 at one extremity of its winding 295, the other extremity of the winding 295 being connected through a conductor 296 to the conductor 291. The pitch fader potentiometer 222 has a wiper 297 connected through a conductor 298 to the pitch axis channel of the automatic pilot apparatus for the aircraft. This circuit is completed through a conductor 299 leading to the conductor 291 and the wiper 287 of the pitch displacement adjustment potentiometer 280. It will be evident from the circuitry described above that the fader potentiometers 222 and 221 for the pitch and roll axes respectively, when positioned in their normal deenergized position or at the right extremity of the winding will present a circuit to the pitch and roll axes of the automatic pilot apparatus which in effect shorts out the portion of the pitch and roll hovering control channels disclosed herein. With the hovering control energized the potentiometers 221 and 222 will have their wipers positioned to the left extremity of their associated windings in which position signals from the channels 20 and 21 will have been faded into the respective channel of the automatic pilot for the aircraft and the circuitry described for the pitch and roll axes will be included in the control circuitry of the automatic pilot apparatus controlling the energization and operation of the servomotors operating the cyclic pitch control. Within the circuits or networks 20 and 21 it will be evident that the signal outputs from the bridges formed by the roll rate and roll displacement, pitch rate and pitch displacement potentiometers would be impressed on the associated adjustment potentiometers and the unbalance of these bridges will be fed to the respective altitude scheduling potentiometers wherein the authority of the before-mentioned bridges will be modified in proportion to the hovering altitude or the adjustment of these potentiometers due to the amount of cable payed out, the respective bridges having less and less authority as the altitude is decreased and from the altitude scheduling potentiometers through the roll and pitch fader potentiometers to the respective channels of the autopilot wherein these circuits will control in conjunction with the components of the automatic pilot apparatus the operation of the cyclic pitch servomotor. As indicated above the specific details of the automatic pilot apparatus form no part of the subject invention except as to be part of our improved hovering control and consequently are omitted here for simplicity. It should be evident, however, that such units would include at least roll and pitch displacement devices responsive to aircraft displacement as distinguished from cable displacement and a servo balance or follow-up potentiometers operated by the respective servomotors controlling the cyclic pitch changing mechanism. The servo balance potentiometers would also have the effect of balancing the network including the networks 20 and 21 respectively, in a conventional manner.

Of the control apparatus described above, the automatic hovering fader potentiometers, the lock and hold solenoid, the sequence engage switches, the master switch and the altitude control beeper switches would be included in the pilot's compartment of the aircraft for manual operation thereof. In addition to the above, the cable motor platform also includes a synchro pickoff or transmitter indicated generally at 301 which cooperates with a synchro unit or receiver 300 mounted in the pilot's compartment which would operate an indicator (not shown) to give a visual indication of the amount of cable payed out and hence the altitude at which hovering is to be controlled. The circuitry for this indicating circuit includes the source of power 312 connected to a primary winding 313 of a transformer 314 whose secondary winding 315 is connected to and energizes the rotor windings 316 and 317 of conventional type synchros. The synchro units 301 and 300 have stator portions 319 and 320 respectively, which are connected together in the conventional manner.

Operation

The automatic hovering control of the subject invention is system designed to provide signals to an automatic pilot apparatus causing a rotary wing type aircraft to hover at a designated altitude above a fixed ground point. It is designed to operate within a range of five to thirty feet of altitude. In addition to the automatic pilot apparatus a separate bridge network or channel is included to control altitude through a collective pitch changing mechanism. Signals from the apparatus are also fed to roll and pitch bridges or portions of the automatic apparatus for lateral and longitudinal positional control. A weighted cable 11 maintained under tension contacts the ground or surface over which hovering is to be done and pivots the cable and sleeve 46 through a gimbal structure 45 mounted on the helicopter or aircraft. Gimbal movement provides signals in the roll and pitch channels 20 and 21 of the hovering control to be fed to the automatic pilot apparatus to control cyclic pitch of the rotor blades. Before engaging the automatic hovering control, the automatic pilot apparatus must be energized and operating and the bridge networks 20, 21 and 22 must be energized. In addition, aircraft must be hovering over the position at the desired altitude. Engagement of the master switch 186 will energize the master relay 185 supplying power to the contacts 143 and 144 of the collective pitch amplifier 140 to energize the cable motor 27. Inasmuch as at this instant the cable is withdrawn in the aircraft, and full tension exists on the same, the potentiometer 37 will be operated to an extreme position calling for down operation or positioning of the aircraft. This will unbalance the bridge network 22 and the output therefrom will be fed to the input stage of the amplifier 140 to close the contact 144 of the pitch amplifier 140 and provide a circuit through the master switch contacts 153 and 154, conductors 155, 156 and 157, switch 144, conductor 160, contacts 163 and 174 in their normally open position to conductor 176, limit switch 178, directional field winding 180, armature 181 and ground connection 182 of cable motor 27, energizing the cable motor in a direction to pay out the cable. The cable and weight will then descend until the weight attached thereto makes contact with the surface of the earth at which time the altitude displacement potentiometer because of the decrease of tension on the spring 29 will center balancing the network 22. Any additional altitude deviations will cause tension change in the cable which is sensed by the altitude displacement potentiometer and causes the cable drum motor to turn maintaining constant tension on the cable. Energization of the cable drum motor causes energization of the anti-engage relay through a circuit which includes the conductors 175 or 176, rectifiers 205 or 206, winding 208 to ground 209 causing its contact 210 to open and preventing energization of the engage relay in the circuit described above. Before engagement, the autopilot should be trimmed to hover over the reference point and should be held at a constant altitude while engaging. Engagement is provided by operation of the manual mechanism closing the sequence engage switches 216 and 217 and energizing the lock and hold solenoid 224 together with operation of the fader potentiometers 221 and 222. As indicated above, an interlock operated by the solenoid 224 prevents the sequence engage switch from being closed unless the anti-engage relay is closed and only switch 216 will make initially setting up the lock and hold circuit after which the engage switch 217 will close setting up the energization circuit for the engage relay 171 for operation thereof. With the energization of the engage relay 171, the contacts 161 and 162 and the contacts 163 and 164 are made disconnecting the collective pitch amplifier from the cable drum motor and connecting the same to the directional field windings 147 and 148 of the collective pitch servomotor 146 in the circuit described above. Thereafter any variation in altitude causing variation in tension on the cable will operate the network 22 to control one or the other of the contacts 143 and 144 and selectively energize one or the other of the collective pitch servo directional field windings 147 and 148 to cause operation there of the collective pitch servomotor in one direction or the other to increase or decrease altitude depending upon whether the tension of the cable has increased or decreased. Also with the closure of the engage relay, a holding circuit is made around the anti-engage relay contacts such that the lock and hold solenoid will be energized through a circuit from the master switch contacts 153 and 154, conductor 155, conductor 156, contact 235, conductor 237, conductor 214, disengage switch 215, sequence engage switch 216, conductor 223, coil 224 to ground 225. Thus, subsequent energization of the cable drum motor will not cause deenergization of the engage relay or disconnect the collective pitch amplifier from the collective pitch servomotor. Similarly, energization of the engage relay 171 sets up the circuit for the engage solenoid 240 in the manner described above connecting the collective pitch servomotor to the collective pitch changing control.

Assuming now that conditions in which the aircraft maintains longitudinal and lateral position with respect to the cable and the weight but varies slightly in altitude causing tension on the altitude displacement potentiometer, the tension present on the cable will operate the potentiometer to unbalance the bridge and selectively energize one or the other of the contacts 143 and 144 to operate the collective pitch servomotor in one direction or the other. Operation of the collective pitch servomotor will operate the servo balance potentiometer 120 to balance the network in a conventional manner. After engagement, desired changes in altitude may be made by momentarily operating the altitude control beepers 227 and 228 or 227 and 229 depending upon the direction in which altitude is to be changed. Closure of these switches will selectively energize one or the other of the relay coils 201 or 202 and close one or the other of the pair of contacts 194 and 196 or 195 and 198 to set up an energization circuit from the master switch contacts 153 and 154 through conductor 155 and 193 to one or the other of the conductors 175 and 176 and one or the other of the directional field windings 179 and 180 of the cable drum motor 27. This would cause the cable to descend or ascend and vary the tension on the spring sensing mechanism to operate the potentiometer 37 unbalancing the bridge network 22 and causing operation of the collective pitch servomotor to position the aircraft to a position where in the altitude displacement potentiometers are again centered. It will be noted under these conditions that the operation of the anti-engage relay will have no effect on opening the energization circuit or the engage relay 171.

Considering now conditions in which the cable is in contact with the surface of the earth and the aircraft is displaced laterally or longitudinally with respect to the point contact between the weight and the ground causing displacement of the sleeve or platform mechanism 45 and 46 and operation of one or the other of the rate gyros 49 and 50 and displacement of the gimbal or the sleeve in such a direction as to operate one or the other or both of the angle potentiometers. Under these conditions, the respective channels 21 and 22 will be energized by a pitch displacement potentiometer or pitch rate potentiometer or the roll rate potentiometer or roll displacement potentiometer sending signals to the altitude scheduling potentiometer which will have been adjusted in proportion to the amount of cable fed out from the drum and will be fed to the respective roll and pitch channels of the automatic pilot apparatus to operate the associated servomotors and effect changes in cyclic pitch control, these servomotors operating associated servo balance potentiometers to balance the respective bridges. It should also be noted that displacement of the cable laterally and longitudinally giving rise to pitch and roll signals or one or the other will unbalance the collective pitch or altitude channel to operate the collective pitch servomotor. Changes are made in collective pitch during lateral or longitudinal displacements for the purpose of compensation for variation in lift due to displacement of the aircraft rotary wing surfaces.

It should also be noted that the rate sensors are included in the roll and pitch channels primarily for stabilization and damping purposes, these devices being capable of rapidly sensing rates of displacement or longitudinal or lateral movement of the aircraft to apply a substantially instantaneous correction before wide displacements of the aircraft or deviations of the aircraft may occur. The rate sensor or altitude rate potentiometer is included in the collective pitch axis 22 and is operated by movement of the cable drum for damping purposes as the cable ascends or descends. In addition, it senses minute rates of movement of the cable drum due to altitude variation causing changes in the cable tension.

Thus it will be seen that in the collective pitch channel, roll and pitch displacement of the aircraft are utilized to modify the operation of the servomotor for adjusting collective pitch to compensate for altitude variation experienced by variation in lift due to lateral or longitudinal displacement of the aircraft. Similarly, in the roll and pitch channels of the aircraft, the altitude scheduling potentiometer modifies the authority of the roll and pitch sensing devices in proportion to the altitude at which hovering takes place so that wide changes in aircraft attitude may not be effected at relatively low altitudes to place the aircraft in an unsafe operating position. The automatic fader controls or potentiometers included in the roll and pitch channels have no effect during engaged operation but merely serve to gradually introduce the error signals from the roll and pitch hovering sections of the hovering control system during engagement so that no wide or large changes in attitude will be called for instantaneously. The operation of this fader control is for the most part conventional with automatic pilot apparatus in which auxiliary equipment is to be connected therewith.

Disengagement of the hovering apparatus may be effected by manual operation of the disengage switch 215 which deenergizes the engage relay and releases the automatic hovering fader switch and associated sequence engage switches. Under these circumstances, however, cable drum motor 27 will remain deenergized except for control signals coming from the collective pitch channel of the autopilot and operating through the collective pitch amplifier to position the cable with respect to the surface of the earth such that the altitude displacement sensor is in a normal position. By opening the master switch 186, master relay 185 is deenergized and the contacts 153 and 190 are made with the master switch removing power from the power circuit 151 through the collective pitch amplifier contacts to the collective pitch servomotor. In the off position of the master switch, a circuit is made from the power source 151 through conductor 152, contacts 153 and 190, conductor 191, conductor 175, up limit switch 177 to directional field winding 179 of the cable drum motor, armature 181 to ground connection 182. This will energize the cable drum motor 27 to rotate in an up direction and cause the weight to be raised up into the helicopter or aircraft. The limit switches 177 and 178 included in the cable drum motor circuitry operate in the conventional manner to deenergize the motor when limit positions are reached. If desired a spring and air dashpot arrangement may be provided for the cable extending from cable drum 31 to damp the movement of the cable 11 connected to weight 12 due to the weights inertia tending to continue upward movement, for example, when the operation of motor 27 is terminated. Similarly, the switches 167 and 168 of the collective pitch servomotor perform a similar function in deenergizing the collective pitch servomotor when limit conditions or positions of control are reached. In the event that the automatic pilot apparatus is deenergized, the power circuit for the master relay 187 will be deenergized and will have the same effect as opening the master switch 186 to deenergize the apparatus and drive the cable to an off position.

In considering this invention it should be kept in mind that the present disclosure is intended to be illustrative only and that the scope of the invention is to be determined only by the appended claims.

We claim as our invention:

1. In combination with a rotary wing aircraft having blade pitch changing means for control of altitude thereof and a second blade pitch changing means for control of lateral and longitudinal displacement thereof, automatic means to maintain the height of the aircraft with respect to the earth's surface including cable means adapted to be fed out of the aircraft and into contact with the earth's surface and cable tension means sensing the position of the cable with respect to the earth's surface servo means controlled by said automatic means and operatively connected to the aircraft blade pitch changing means to correct for changes in altitude of the aircraft as sensed by said cable tension means, means including lateral and longitudinal displacement sensing means associated with said cable means and operated by displacement of said cable means longitudinally and laterally relative to said aircraft, and servo means connected to said second blade pitch changing means and controlled by said last named means for positioning the aircraft with respect to a point on the surface of the earth.

2. In combination with a rotary wing aircraft having means to alter the lift vector thereof for control of altitude of said aircraft, automatic means to maintain height of the aircraft with respect to the earth's surface including a driving and driven member, said driving member having a cable with a weight attached thereto adapted to be fed out of the aircraft and into contact with the earth's surface, connecting means between the driving and driven member, a signal generator attached to said connecting means sensing differential position of the driving and driven members, servo means controlled by said automatic means and operatively connected to the aircraft lift vector changing means to correct for changes in altitude of the aircraft as sensed by said automatic means, and means connected to said cable for varying the length of the cable fed out from the aircraft to vary with said automatic means the height of the aircraft above the earth's surface.

3. In combination with a dirigible craft having means for control of altitude thereof and a second means for control of lateral and longitudinal displacement thereof, automatic means to maintain the height of the craft with respect to a datum surface including a device which is adapted to be fed out of the craft and into contact with the datum surface, a driving and driven member, said device extending from the driven member, connecting means between the driving and driven members, a signal generator attached to said connecting means such that said signal generator is operated with relative change in position of the driving and driven members, servo means connected to and controlled by said automatic means and operatively connected to said craft means control of altitude to correct for changes in altitude of the craft as sensed by said automatic means, means including lateral and longitudinal displacement sensing means associated with said device and operated by displacement of said device laterally and longitudinally relative to said craft, and servo means connected to said lateral and longitudinal displacement control means and controlled by said last named means for positioning the craft with respect to the point of contact of said device on the datum surface.

4. In combination with a rotary wing aircraft having blade pitch changing means for control of altitude thereof and a second blade pitch changing means for control of lateral and longitudinal displacement thereof, automatic means to maintain the height of the aircraft with respect to the earth's surface including a cable with a weight attached thereto which is adapted to be fed out of the aircraft and into contact with the earth's surface and a cable tension means associated therewith, a signal generator attached to said cable through said tension means such that said signal generator is operated as said cable comes in contact with the earth's surface, servo means connected to and controlled by said automatic means and operatively connected to said aircraft blade pitch changing means to correct for changes in altitude of the aircraft as sensed by said automatic means, means including lateral and longitudinal displacement sensing means associated with said cable means and operated by displacement of said cable means laterally and longitudinally relative to said aircraft, servo means connected to said second blade pitch changing means and controlled by said last named means for positioning the aircraft with respect to the point of contact of said weight on the surface of the earth, and means attached to said cable for varying the length of said cable fed out from said aircraft to vary with said automatic means the height of the aircraft above the earth's surface.

5. In combination with a dirigible craft having means for control of altitude thereof and a second means for control of lateral and longitudinal displacement thereof, automatic means to maintain the height of the aircraft with respect to the earth's surface including cable means adapted to be fed out of the aircraft and into contact with a datum surface and cable tension means sensing the position of the cable with respect to the earth's surface, servo means controlled by said automatic means and operatively connected to the altitude controlling means to correct for changes in altitude of the aircraft as sensed by said cable means, means including lateral and longitudinal displacement sensing means associated with said cable means and operated by displacement of said cable means longitudinally and laterally relative to said aircraft, means connecting said second means to said last named means for positioning the aircraft with respect to a point on the datum surface, and means responsive to the altitude of the aircraft above the datum surface for varying the authority of said lateral and longitudinal displacement sensing means in control of said second means.

6. In combination with a rotary wing aircraft having blade pitch changing means for control of altitude thereof and a second means for control of lateral and longitudinal displacement thereof, automatic means to maintain the height of the aircraft with respect to the earth's surface including cable means adapted to be fed out of the aircraft and into contact with the earth's surface and cable tension means sensing the position of the cable with respect to the earth's surface, a signal generator attached to said cable through a means sensing tension of the cable such that said signal generator is operated as said cable comes in contact with the earth's surface, rate sensing means associated with said cable means for sensing rate of change of altitude of the aircraft, and providing a signal in response thereto and servo means controlled by said automatic means and said rate sensing means and operatively connected to the aircraft blade pitch changing means to correct for changes in altitude of said aircraft, means including lateral and longitudinal displacement sensing means associated with said cable means and operated by displacement of said cable means longitudinally and laterally relative to said aircraft, and means connecting said second means to said last named means for positioning the aircraft with respect to a point on the surface of the earth.

7. In combination with a dirigible craft having lift varying means for control of altitude thereof and a second means for control of lateral and longitudinal displacement thereof, automatic means to maintain height of the aircraft with respect to the earth's surface including a cable with a weight attached thereto adapted to be fed out of the aircraft and into contact with the earth's surface, a signal generator attached to said cable through a means sensing tension of the cable such that said signal generator is operated as said cable comes in contact with the earth's surface, servo means controlled by said automatic means and operatively connected to the aircraft blade pitch changing means to correct for changes in altitude of the aircraft as sensed by said cable means, means sensing lateral and longitudinal rate of displacements of said aircraft associated with said cable means and operated by the rate of displacement of said cable means laterally and longitudinally relative to said aircraft, and means connecting said second means for control cojointly by said lateral and longitudinal rate of displacement sensing means for positioning the aircraft with respect to the point of contact of said cable on the surface of the earth.

8. In combination with a rotary wing aircraft having blade pitch changing means for control of altitude thereof and a second means for control of lateral and longitudinal displacement thereof, automatic means to maintain the height of the aircraft with respect to the earth's surface including a cable with a weight attached thereto adapted to be fed out of the aircraft and into contact with the earth's surface and a cable tension sensing means sensing the position of the cable with respect to the earth's surface, a signal generator means attached to said cable through said tension sensing means such that the signal generator is operated by said cable as it comes in contact with the earth's surface, rate sensing means associated with said cable for sensing the rate of change of altitude of the aircraft, servo means controlled by said automatic means and said rate sensing means cojointly and operatively connected to said aircraft with blade pitch changing means to correct the changes in altitude of the aircraft as sensed by said cable means, means including lateral and longitudinal displacement sensing means associated with said cable means and operated by displacement of said cable means laterally and longitudinally relative to the aircraft, means sensing lateral and longitudinal rate of displacement of said cable means, and means connecting said second means to said lateral and longitudinal displacement and rate sensing means for positioning the aircraft with respect to the point of contact of said cable on the surface of the earth.

9. In combination with a rotary wing aircraft having blade pitch changing means for control of altitude thereof and a second blade pitch changing means for control of lateral and longitudinal displacement thereof, automatic means to maintain the height of the aircraft with respect to the earth's surface including a cable with a weight attached thereto adapted to be fed out of the aircraft and into contact with the earth's surface and a cable tension sensing means sensing the position of the cable with respect to the earth's surface, a signal generator means attached to said cable through said tension sensing means such that the signal generator is operated by said cable as it comes in contact with the earth's surface, rate sensing means associated with said cable for sensing the rate of change of altitude of the aircraft, servo means controlled by said automatic means and said rate sensing means conjointly and operatively connected to said aircraft with blade pitch changing means to correct the changes in altitude of the aircraft as sensed by said cable means, means including lateral and longitudinal displacement sensing means associated with said cable means and operated by displacement of said cable means laterally and longitudinally relative to the aircraft, means sensing lateral and longitudinal rate of displacement of said cable means, and servo means connected to said second blade pitch changing means and controlled by said lateral and longitudinal displacement and rate sensing means for positioning the aircraft with respect to the point of contact of said cable of the surface of the earth, and means connected to said cable means for varying the length of the cable fed out of the aircraft for varying with said automatic means the height of the aircraft above the earth's surface.

10. In combination with a rotary wing aircraft having blade pitch changing means for control of altitude thereof and a second blade pitch changing means for control of lateral and longitudinal displacement thereof, automatic means to maintain the height of the aircraft with respect to the earth's surface including cable means adapted to be fed out of the aircraft and into contact with the earth's surface and cable tension means sensing the position of the cable with respect to the earth's surface, servo means controlled by said automatic means and operatively connected to the aircraft blade pitch changing means to correct for changes in altitude of the aircraft as sensed by said cable means, means including lateral and longitudinal displacement sensing means associated with said cable means and operated by displacement of said cable means longitudinally and laterally relative to said aircraft, servo means connected to said second blade pitch changing means and controlled by said last named means for positioning the aircraft with respect to the point of contact of said weight on the surface of the earth, and means included in said automatic means and responsive to lateral and longitudinal displacement of said aircraft to modify the control of said blade pitch changing means by said cable means.

11. In combination with a rotary wing aircraft having blade pitch changing means for control of altitude thereof and a second blade pitch changing means for control of lateral and longitudinal displacement thereof, automatic means to maintain the height of the aircraft with respect to the earth's surface including a cable with a weight attached thereto which is adapted to be fed out of the aircraft and into contact with the earth's surface and a cable tension means associated therewith, a signal generator attached to said cable through said tension means such that said signal generator is operated as said cable comes in contact with the earth's surface, servo means connected to and controlled by said automatic means and operatively connected to said aircraft blade pitch changing means to correct for changes in altitude of the aircraft as sensed by said automatic means, means including lateral and longitudinal displacement sensing means associated with said cable means and operated by displacement of said cable means laterally and longitudinally relative to said aircraft, servo means connected to said second blade pitch changing means and controlled by said last named means for positioning the aircraft with respect to the point of contact of said weight on the surface of the earth, and means including said automatic means and responsive to lateral and longitudinal displacement of said aircraft to modify the control of said first named blade pitch changing means by said cable means.

12. In combination with a dirigible craft having a means for control of altitude thereof, a hovering control including a table mounted on the aircraft and a device movable into and out of the aircraft, a driving and a driven member, said device extending from said driven member, connecting means between said driving and driven members, signal generator means connected to and operated by said connecting means with relative change between said driving and driven members as said device is brought into and out of contact with a datum surface, circuit means including said signal generator means for controlling the operation of said altitude control means to control hovering of the aircraft.

13. In combination with a dirigible craft having a means for control of altitude thereof, a hovering control including a table mounted on the craft and a cable with a weight attached thereto wound on a reel and a drive for said reel for moving said cable into and out of the aircraft, tension sensing means connected to said cable drive and responsive to variations in tension on said cable, signal generator means connected to and operated between signal producing positions by said tension sensing means as said weight on the cable is brought into and out of contact with the surface of the earth, rate sensing means including a second signal generator operated thereby attached to said cable drive and responsive to rate at which cable is moved into and out of the aircraft, circuit means including said first and second named signal generator means for controlling conjointly the operation of said altitude means to control hovering of the aircraft.

14. In combination with a rotary wing aircraft having a collective blade pitch changing means for control of altitude thereof and a cyclic blade pitch changing means for control of lateral and longitudinal displacement thereof, a hovering control including a table mounted on said aircraft and carrying a cable with a weight attached thereto wound on a reel and a drive for said reel for moving the cable into and out of the aircraft, tension sensing means connected to said cable reel drive and responsive to variations in tension on said cable, signal generator means connected to and operated between signal producing positions by the tension sensing means, second signal generator means responsive to the length of the cable fed out of the aircraft, rate sensing means including a third signal generator attached to the cable drive and responsive to rate at which cable is moved into and out of the aircraft, circuit means including said first and third signal generator means for controlling the operation of said collective pitch changing means to control hovering of the aircraft, a platform gimbaled on said table and below said table and having a guide means through which said cable passes, said cable displacing said platform about the displacement axes of the platform as the cable departs from a vertical position, fourth signal generator means associated with said gimbal structure and responsive to the angular displacement of said platform, second circuit means including said second and fourth signal generator means operative to control said cyclic pitch changing means to control lateral and longitudinal displacement of the aircraft as it hovers.

15. In combination with a rotary wing aircraft having a collective blade pitch changing means for control of altitude thereof and a cyclic blade pitch changing means for control of lateral and longitudinal displacement thereof, a hovering control including a table mounted on said aircraft and carrying a cable with a weight attached thereto wound on a reel and a drive for said reel for moving the cable into and out of the aircraft, tension sensing means connected to said cable reel drive and responsive to variations in tension on said cable, signal generator means connected to and operated between signal producing positions by the tension sensing means, second signal generator means responsive to the length of the cable fed out of the aircraft, rate sensing means including a third signal generator attached to cable drive and responsive to rate of movement of the cable into and out of the aircraft, circuit means including said first and third signal generator means for controlling the operation of said collective pitch changing means to control hovering of the aircraft, a platform gimbaled on said table and below said table and having guide means through which said cable passes, rate sensing devices mounted on said platform and responsive to displacement of said platform about each of a pair of displacement axes with the gimbal platform, said cable displacing said platform about its gimbaled axes as said cable departs from a vertical position, fourth signal generator means associated with said gimbal mounting of the platform and responsive to angular displacement of the platform, circuit means including said second and said fourth signal generator means and said rate sensing means operative to control the cyclic pitch changing means to control lateral and longitudinal displacement of the aircraft while hovering.

16. In combination with a rotary wing aircraft having a collective blade pitch changing means for control of altitude thereof and a cyclic blade pitch changing means for control of lateral and longitudinal displacement thereof, a hovering control including a table mounted on said aircraft and carrying a cable with a weight attached thereto wound on a reel and a drive for said reel for moving the cable into and out of the aircraft, tension sensing means connected to said cable reel drive and responsive to variations in tension on said cable, signal generator means connected to and operated between signal producing positions by the tension sensing means, rate sensing means including a second signal generator attached to the cable drive and responsive to rate of movement of the cable into and out of the aircraft, circuit means including said first and second signal generator means for controlling the operation of said collective pitch changing means to control hovering of the aircraft, a platform gimbaled on said table and below said table and having a guide means through which said cable passes, said cable displacing said platform about the axes of the platform as the cable departs from a vertical position, third and fourth signal generator means associated with said gimbal structure and responsive to the angular displacement and rate of displacement of said platform, second circuit means including said third and fourth signal generator means operative to control said cyclic pitch changing means to control lateral and longitudinal displacement of the aircraft as it hovers, and fifth signal generator means responsive to the length of cable fed out of the aircraft and included in said second named circuit means to modify the authority of displacement and rate sensing means in the control of lateral and longitudinal displacement of the aircraft.

References Cited in the file of this patent
UNITED STATES PATENTS

| | | |
|---|---|---|
| 2,443,028 | Edwards | June 8, 1948 |
| 2,650,046 | Vanderlip | Aug. 25, 1953 |
| 2,745,498 | Nagler | May 15, 1956 |